United States Patent
Flessner et al.

(10) Patent No.: US 7,273,044 B2
(45) Date of Patent: Sep. 25, 2007

(54) HYDROGEN FUEL SYSTEM FOR AN INTERNAL COMBUSTION ENGINE

(76) Inventors: Stephen M. Flessner, 4946 Jaymar Dr., Sugar Land, TX (US) 77479; Eric S. Flessner, 4946 Jaymar Dr., Sugar Land, TX (US) 77479

( * ) Notice: Subject to any disclaimer, the term of this patent is extended or adjusted under 35 U.S.C. 154(b) by 51 days.

(21) Appl. No.: 10/951,290

(22) Filed: Sep. 27, 2004

(65) Prior Publication Data

US 2006/0065214 A1  Mar. 30, 2006

(51) Int. Cl.
*F02G 1/00* (2006.01)
(52) U.S. Cl. ....................................................... 123/536
(58) Field of Classification Search ................ 123/3, 123/536, 538, 579, 568.12, 511
See application file for complete search history.

(56) References Cited

U.S. PATENT DOCUMENTS

| | | | |
|---|---|---|---|
| 4,003,345 A * | 1/1977 | Bradley | 123/3 |
| 4,099,489 A * | 7/1978 | Bradley | 123/3 |
| 4,361,474 A * | 11/1982 | Shoaf et al. | 204/239 |
| 4,442,801 A * | 4/1984 | Glynn et al. | 123/3 |
| 4,657,829 A | 4/1987 | McElroy et al. | |
| 5,450,822 A | 9/1995 | Cunningham | |
| 6,257,175 B1 | 7/2001 | Mosher et al. | |
| 6,311,648 B1 | 11/2001 | Larocque | |
| 6,311,650 B1 | 11/2001 | Lamm | |
| 6,314,732 B1 * | 11/2001 | Lookholder | 60/597 |
| 6,508,210 B2 * | 1/2003 | Knowlton et al. | 123/3 |
| 6,516,905 B1 | 2/2003 | Baumert et al. | |
| 6,571,747 B1 * | 6/2003 | Gerstweiler | 123/3 |
| 6,628,006 B2 | 9/2003 | Oglesby et al. | |
| 6,655,325 B1 * | 12/2003 | Botti et al. | 123/3 |
| 6,659,049 B2 | 12/2003 | Zagaja et al. | |
| 6,716,546 B2 | 4/2004 | Oglesby et al. | |
| 6,787,258 B2 * | 9/2004 | Prerad | 429/21 |
| 7,059,277 B2 * | 6/2006 | Matsuoka | 123/3 |
| 2001/0013321 A1 * | 8/2001 | Knowlton et al. | 123/3 |
| 2001/0028869 A1 * | 10/2001 | Caren et al. | 422/186.3 |
| 2003/0070938 A1 * | 4/2003 | Mali | 205/637 |
| 2005/0115226 A1 * | 6/2005 | Benz et al. | 60/287 |
| 2005/0224042 A1 * | 10/2005 | Shinagawa et al. | 123/295 |

* cited by examiner

*Primary Examiner*—Willis R. Wolfe
*Assistant Examiner*—Jason Benton
(74) *Attorney, Agent, or Firm*—Nick A. Nichols, Jr.

(57) ABSTRACT

A hydrogen fuel system for an internal combustion engine includes an electrolyzer for generating hydrogen and oxygen gases. The engine exhaust may be recycled through the electrolyer where it is converted to hydrogen and oxygen. A water reservoir in fluid communication with the electrolyzer maintains the water level in the elctrolyzer. The hydrogen and oxygen generated by the electrolyzer may be routed to the internal combustion engine and provide the fuel for the engine. Hydrogen and oxygen not consumed by operation of the engine is stored in separate pressurized storage tanks. Expanders lower the pressure of pressurized hydrogen and oxygen for use to power the engine and provide electric power to the electrolyzer.

25 Claims, 4 Drawing Sheets

HYDROGEN FUEL SYSTEM FOR AN INTERNAL COMBUSTION ENGINE

BACKGROUND OF THE DISCLOSURE

The present invention relates generally to a vehicle having an internal combustion engine, and more particularly, to an internal combustion engine powered by hydrogen fuel.

A typical internal combustion engine that is used in automobiles, trucks or other vehicles is generally powered by gasoline or diesel fuel. A gasoline powered internal combustion engine, however, generates pollutants that are expelled into the atmosphere. Pollution from internal combustion engines is a serious problem and many remedies have been proposed. It is known, for example, that adding oxygen into the fuel stream decreases the pollution caused by internal combustion engines. It is also known that hydrogen provides a source of clean energy. Furthermore, the combustion of hydrogen generates water as a by-product that may be electrolyzed to form hydrogen and oxygen gases.

U.S. Pat. No. 6,257,175 (Mosher et al.) describes apparatus for generating hydrogen and oxygen from an electrolysis unit. The gases are gathered separately in the unit and flow to the intake manifold of the engine in separate conduits. U.S. Pat. No. 6,659,049 (Baumert et al.) describes a vehicle with a fuel cell system. Electric power from the vehicle's alternator is used to power an electrolyzer. Hydrogen produced by the electrolyzer is used as fuel for the fuel cell system. The fuel cell system provides electric power for the low power electrical requirements of the vehicle, i.e., lighting, air conditioner, radio, etc., when the engine of the vehicle is not running. While these apparatus contribute to a reduction of pollutant emissions of internal combustion engines, hydrocarbon fuels still provide the primary energy requirements for the vehicles. Pollutant emissions of motor vehicles, however, must still be drastically reduced to have an environmental impact.

It is therefore an object of the present invention to provide an internal combustion engine powered by a hydrogen fuel system.

It is another object of the present invention to provide a vehicle having an electrolysis unit for generating hydrogen and oxygen.

It is another object of the present invention to provide a vehicle fuel system that recycles engine exhaust as input to an electrolysis unit to generate hydrogen and oxygen which may be re-used as fuel to power the vehicle.

It is another object of the present invention to provide a vehicle fuel system having removable storage capacity for hydrogen or oxygen generated by an electrolysis unit.

It is another object of the present invention to provide a vehicle fuel system utilizing expanders to generate electric power from high pressure gases.

SUMMARY OF THE INVENTION

In accordance with the present invention, a hydrogen fuel system for an internal combustion engine includes an electrolyzer for generating hydrogen and oxygen gases. The exhaust of the engine may be recycled through the electrolyzer where it is converted to hydrogen and oxygen which may be used as fuel for the internal combustion engine. A water reservoir in fluid communication with the electrolyzer is provided to maintain the water level in the elctrolyzer at an optimum operating level. Hydrogen and oxygen generated by the electrolyzer may be routed to the internal combustion engine to provide the fuel for the engine. Hydrogen and oxygen generated by the electrolyzer which is not consumed by operation of the engine may be stored in pressurized storage tanks for use when required to power the internal combustion engine. Expanders are incorporated in the fuel system of the invention for lowering the pressure of the pressurized hydrogen and oxygen to the engine pressure requirements and for utilizing the potential energy stored within the pressurized gases to provide a portion of the electrical power requirements of the fuel system. The fuel system includes external ports and electrical outlets for connecting to external water and power sources.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

Figure 1:
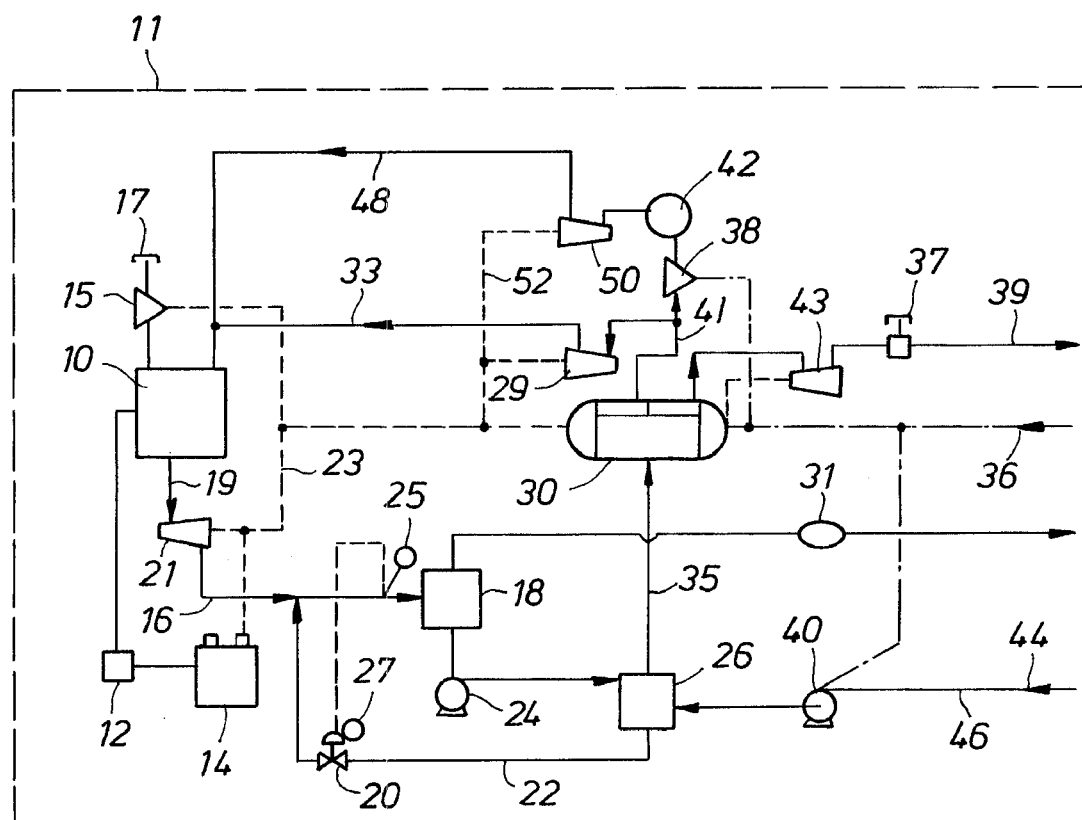
FIG. 1 is a block diagram of a preferred embodiment of the invention adapted for using an air and hydrogen fuel mixture and recycled engine exhaust vapor to power an internal combustion engine.

Referring first to FIG. 1, a block diagram of the fuel system of the present invention is shown operatively connected to an internal combustion engine 10 of a vehicle 11, such as an automobile or the like. The fuel system of the present invention may be retrofit into an existing gasoline powered vehicle or incorporated in a new vehicle design. The internal combustion engine 10 is modified in a known manner to operate with a hydrogen fuel mixture. It is further understood that the vehicle 11 includes an engine control unit and sensors (not shown in the drawings) electrically and communicatively coupled to the fuel system of the present invention.

The vehicle 11 powered by the fuel system of the present invention is equipped with conventional components such as an alternator 12, a battery 14 and other electrical devices. As in conventional vehicles, the alternator 12 produces electric power while the engine 10 is operating. The battery 14 is used for starting the engine 10, storing the output of the alternator 12 and powering the electrical components of the vehicle 11 while the engine 10 is not operating.

Referring still to FIG. 1, air and hydrogen are used to power the internal combustion engine 10. A compressor 15 draws air through a port 17 which is open to the atmosphere. Air is pressurized by the compressor 15 to the required engine pressure and routed to the intake manifold of the engine 10. Hydrogen is also routed to the intake manifold of the engine 10 from an electrolyzer 30 and a hydrogen storage tank 44 to form the fuel mixture for powering the engine 10, described in greater detail hereinafter.

Exhaust vapor exits the engine 10 at a high temperature and moderate pressure. The engine exhaust is routed through a conduit 19 to an expander 21 where the pressure of the exhaust vapor is decreased. The expander 21 is electrically coupled to the electrolyzer 30 via a power line 23. The expander 21 converts the potential energy stored within the engine exhaust vapor into electric power used to provide part of the power requirements of the electolyzer 30.

The exhaust vapor from the engine 10 flows through the expander 21 at a reduced pressure and is channeled by a conduit 16 to an air-cooled condenser 18. The exhaust from the engine 10 contains hydrogen, oxygen, water vapor and potential pollutants, such as NOx, at a temperature of about 1000° F. A temperature element or sensor 25 located in the conduit 16 upstream from the condenser 18 measures the temperature of the engine exhaust entering the condenser 18 and communicates the exhaust temperature value to a temperature controller 27 which operates a water valve 20 connected to the conduit 16 upstream of the temperature element 25. The valve 20 is connected by a water supply line 22 to a water reservoir 26. In response to the temperature of the engine exhaust, the controller 27 operates the valve 20 in a desired manner to spray water into the exhaust conduit 16, and thereby cool the engine exhaust vapor to the water saturation point prior to entering the condenser 18, where it is condensed into water. Cooling the engine exhaust reduces the backpressure on the engine 10 as the exhaust vapor passes through the condenser 18. A reduction in engine backpressure improves engine performance through increased horsepower availability. The condensed water exiting the condenser 18 is pumped by a pump 24 to the water reservoir 26. Any gases formed in the condenser 18 are first channeled through a catalytic converter 31 for removal of any potential pollutants and then vented to the atmosphere.

Referring still to FIG. 1, a water conduit 35 connects the water reservoir 26 to the electrolyzer 30. The electrolyzer 30 is provided with sensors for maintaining the water level in the electrolyzer 30 at an optimum level for efficient performance. The electrolyzer 30 generates hydrogen and oxygen by electrolysis. The electrolyzer 30 operates at a pressure of about 363 psig. The pressurized hydrogen generated by the electrolyzer 30 is passed through an expander 29 where the hydrogen pressured is lowered to the engine intake pressure and routed to the intake manifold of the engine 10 via conduit 33. The oxygen generated by the electrolyzer 30 is passed through an expander 43 and an air mixer 37 incorporated in a vent conduit 39 connected to the electrolyzer 30 and vented to the atmosphere. The expanders 29 and 43 are electrically coupled to the electrolyzer 30.

When the vehicle 11 is operating, electric power to operate the electrolyzer 30 for production of hydrogen and oxygen is provided by an electric circuit comprising the alternator 12, the battery 14 and the expanders operatively connected to the electrolyzer 30. When the vehicle 11 is not operating, hydrogen and oxygen is generated by the electrolyzer 30 by connecting the vehicle 11 to an external power source, such as a standard residential electrical outlet. The vehicle 11 is provided with an electrical outlet 36 for connection to the external power source. The outlet 36 is electrically coupled to the electrolyzer 30, hydrogen compressor 38 and water pump 40 housed in the vehicle 11, thereby forming a second electric circuit for operating the electrolyzer 30.

Hydrogen produced by the electrolyzer 30 when the vehicle 11 is not operating and connected to an external power source is routed via conduit 41 to the compressor 38 and then to the hydrogen storage tank 42. The hydrogen is pressurized by the compressor 38 and stored in the storage tank 42 as pressurized vapor. The storage tank 42 is removable so that it may be replaced with a spare tank of hydrogen when the tank 42 becomes empty and an external electrical power source may not be readily available to recharge the tank 42.

Hydrogen conduit 48 connects the pressurized hydrogen storage tank 42 to the intake manifold of the engine 10. Hydrogen which exits the storage tank 42 at a high pressure is routed through the expander 50 where the pressure of the hydrogen is decreased to the required engine intake pressure. The expander 50 is electrically coupled to the electrolyzer 30 by a power line 52. The expander 50 converts the potential energy stored within the pressurized hydrogen into electric power used to power the electrolyzer 30.

Periodically, the water reservoir 26 will require replenishment. The vehicle 11 is provided with a water pump 40 and a water port 44 in fluid communication with the water reservoir 26 via a water line 46. The port 44 provides access for adding water to the reservoir 26 as is required. Tap water may be used to fill the reservoir 26 as needed. However, distilled water may also be used if desired. Electrolyte for aiding the electrolysis process may also be added through the port 44.

The fuel system of the present invention may be retrofit into an existing vehicle or incorporated in a new vehicle design. While the use of hydrogen fuel for an internal combustion engine is known and understood in the art, the hydrogen fuel system of the present invention utilizes expanders to recover power from pressurized hydrogen and oxygen to supplement the electric power available to operate the electrolzyer and recycles the engine exhaust to produce more hydrogen and oxygen for fuel and thereby extend the driving range of the vehicle. In the operation of a vehicle 11 equipped with the fuel system of the present invention illustrated in FIG. 1, exhaust vapor from the internal combustion engine 10 is cooled as it is routed to a condenser 18 where the exhaust vapor is condensed into water and routed to the water reservoir 26. Water from the water reservoir 26 is supplied to the electrolyzer 30 where, through the action of electrolysis, hydrogen and oxygen gases are generated. The hydrogen generated by the electrolyzer 30 is routed to the engine 10 for powering the vehicle 11. The oxygen generated by the electrolyzer 30 is safely vented to the atmosphere. The fuel system of the present invention generates no pollutant emissions.

Figure 2:
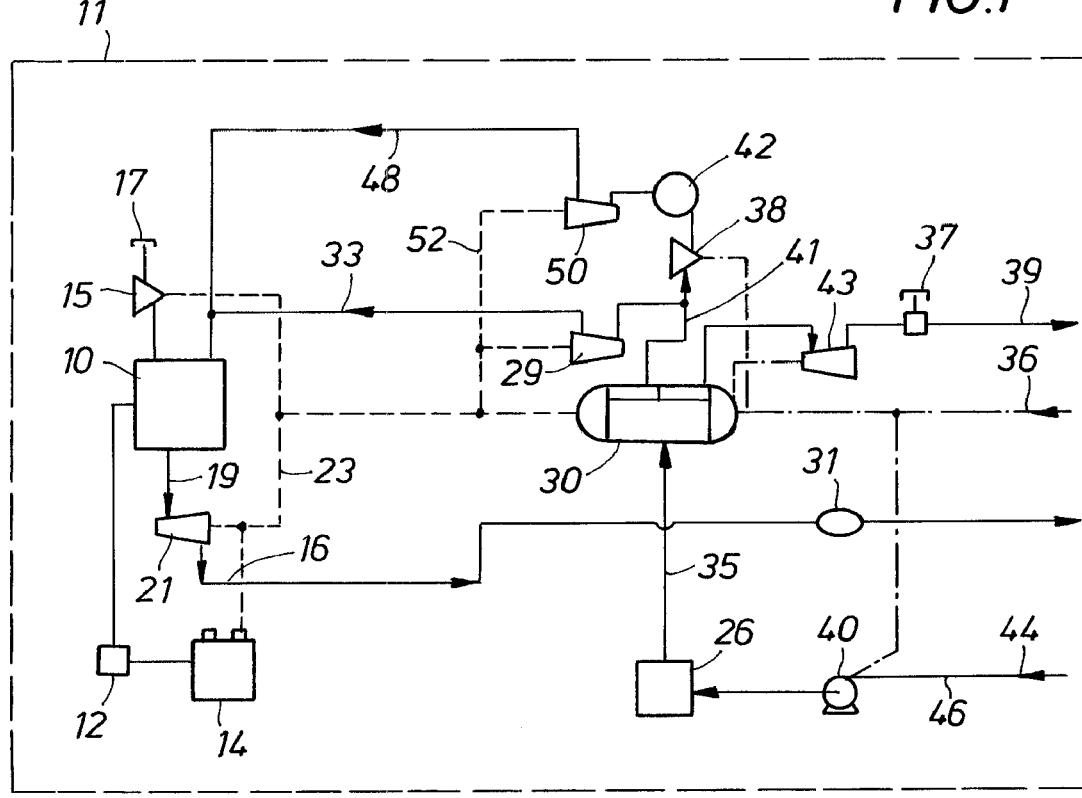
FIG. 2 is a block diagram of an alternate embodiment of the invention depicted in FIG. 1 wherein the engine exhaust vapor is passed through a catalytic converter and vented to the atmosphere.

Referring now to FIG. 2, an alternate embodiment of the fuel system of the present invention is shown. The embodiment of FIG. 2 is substantially the same as the embodiment of FIG. 1 described hereinabove, however, in the embodiment of FIG. 2 the exhaust from the internal combustion engine 10 is vented to the atmosphere rather than being recycled. Hydrogen to power the engine 10 is provided by the electrolysis of water in the electrolyzer 30 and the hydrogen stored in storage tank 42.

Figure 3:
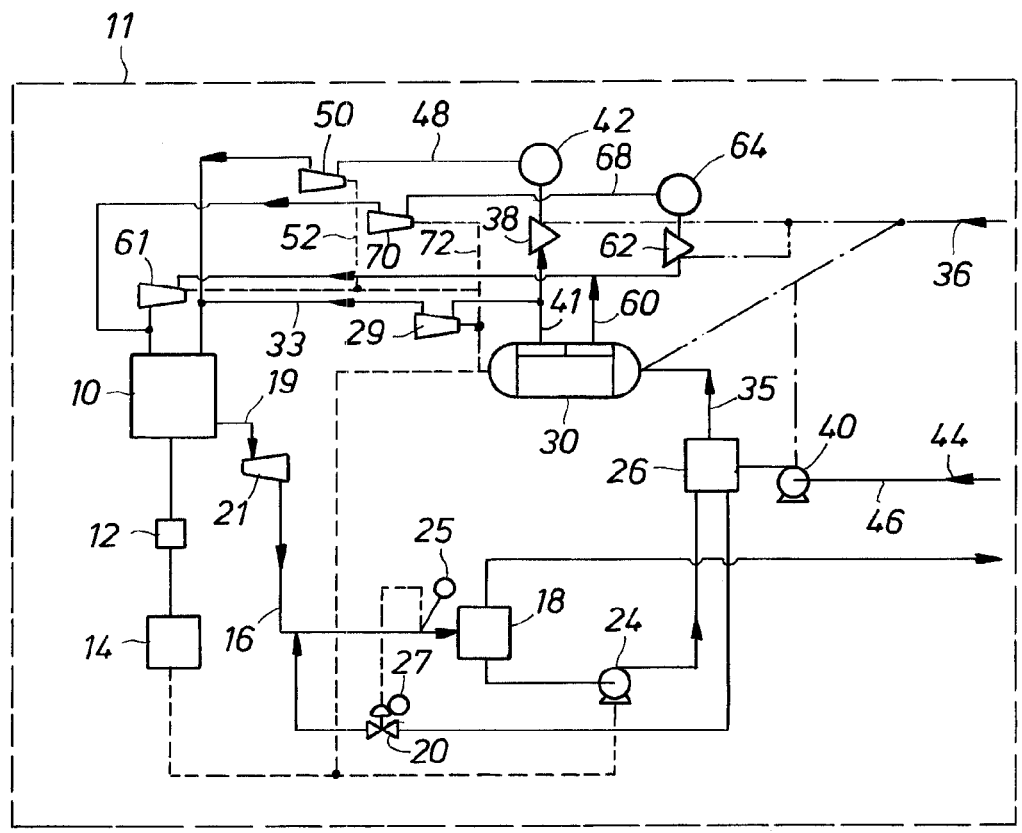
FIG. 3 is a block diagram of an alternate embodiment of the invention adapted for using a hydrogen and oxygen fuel mixture and recycled engine exhaust vapor to power an internal combustion engine.
Figure 4:
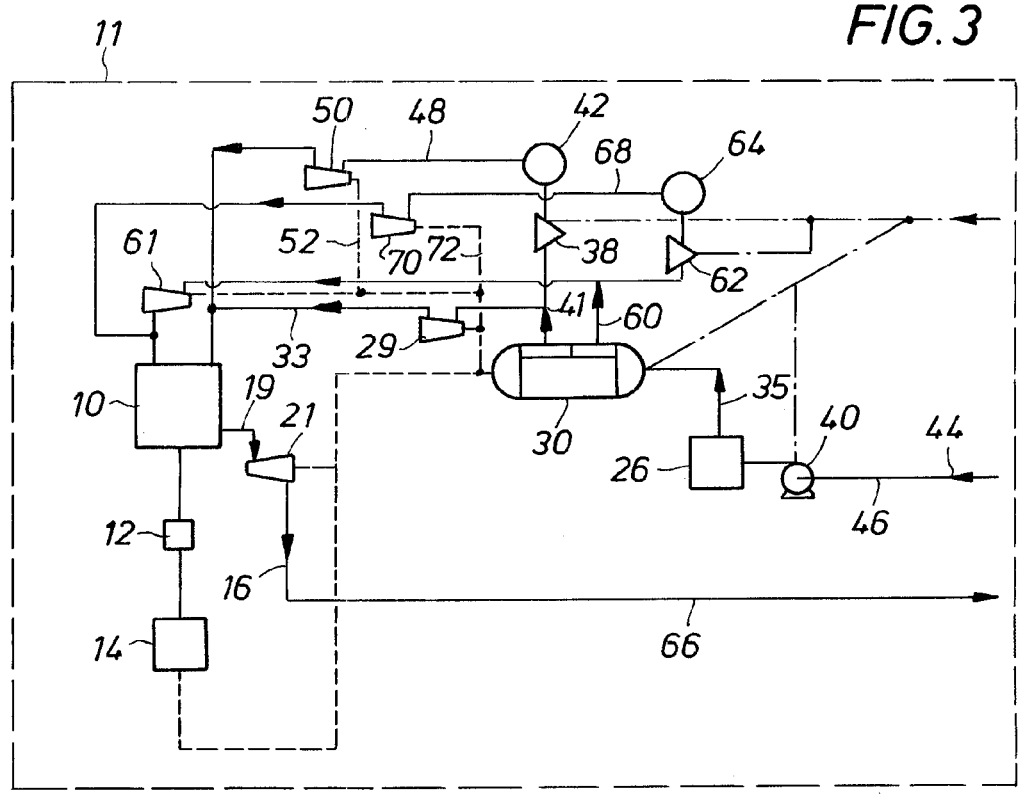
FIG. 4 is a block diagram of an alternate embodiment of the invention depicted in FIG. 3 wherein the engine exhaust vapor is vented to the atmosphere.

In another embodiment of the invention shown in FIG. 3, the fuel system of the invention is similar to that described in FIG. 1 with the exception that hydrogen and oxygen comprise the fuel to power the engine 10. As illustrated in FIG. 3, the exhaust vapors from the engine 10 are cooled and recycled as described hereinabove. Oxygen generated by the electrolyzer 30, however, is routed via a conduit 60 and expander 61 to the intake manifold of the engine 10. When the vehicle 11 is off but connected to an external power source, oxygen generated by the electrolyzer 30 is routed to a compressor 62 where it is pressurized and stored in an oxygen storage tank 64. In an alternate embodiment illustrated in FIG. 4, the engine exhaust is not recycled, but is instead vented to the atmosphere through a vent conduit 66.

Referring again to FIG. 3, an oxygen conduit 68 connects the compressed oxygen storage tank 64 to the intake manifold of the engine 10. Oxygen which exits the storage tank 64 at a high pressure is routed through an expander 70 where the pressure of the oxygen is decreased to the required engine pressure. The expander 70 is electrically coupled to the electrolyzer 30 by a power line 72. The expander 70 converts the potential energy stored within the pressurized oxygen into electrical power which is used to power the electolyzer 30.

Figure 5:
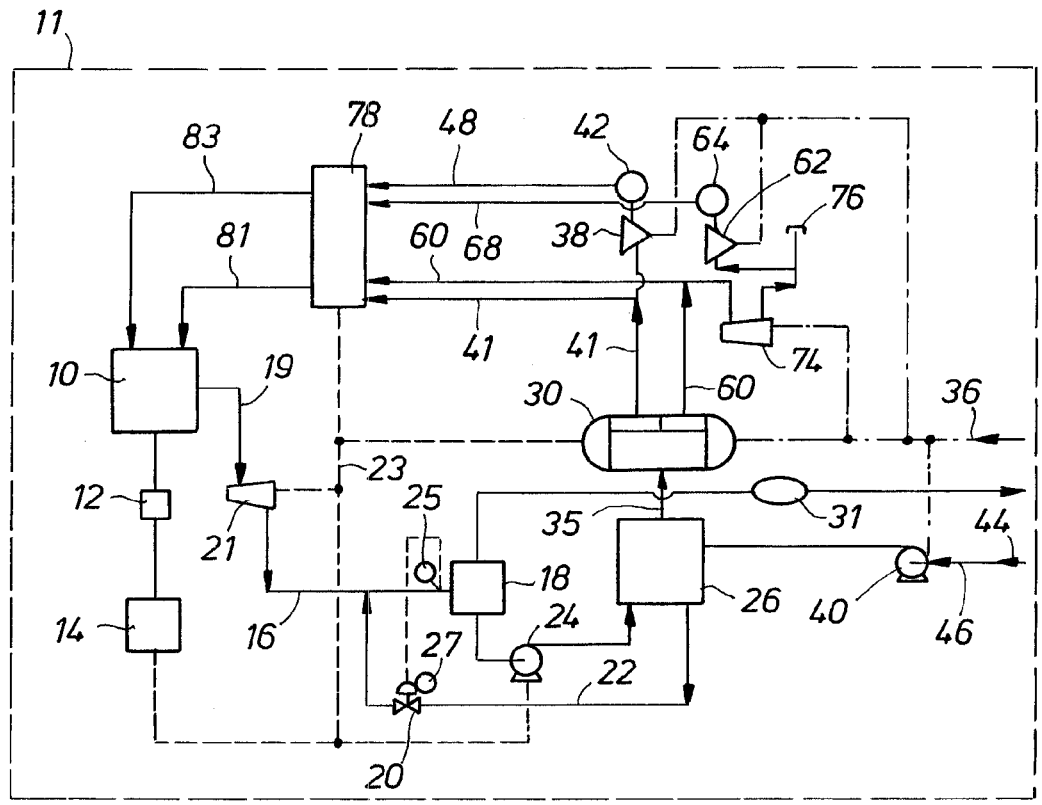
FIG. 5 is a block diagram of an alternate embodiment of the invention depicted in FIG. 3 adapted for mixing air with pressurized oxygen stored in a storage tank for supplying pressurized air and oxygen to the fuel mixture to power an internal combustion engine.

Referring now to FIG. 5, another alternate embodiment of the fuel system of the present invention is shown. The embodiment of FIG. 5 is substantially the same as the embodiment of FIG. 3 described hereinabove with the exception that oxygen generated by the electrolyzer 30 and not routed to the engine 10 via conduit 60, is routed through an expander 74 where the pressure is lowered to ambient pressure. The oxygen is then passed through an air mixer 76 and the resulting mixture of air and oxygen is routed to the compressor 62 where it is pressurized and stored in storage tank 64.

Figure 6:
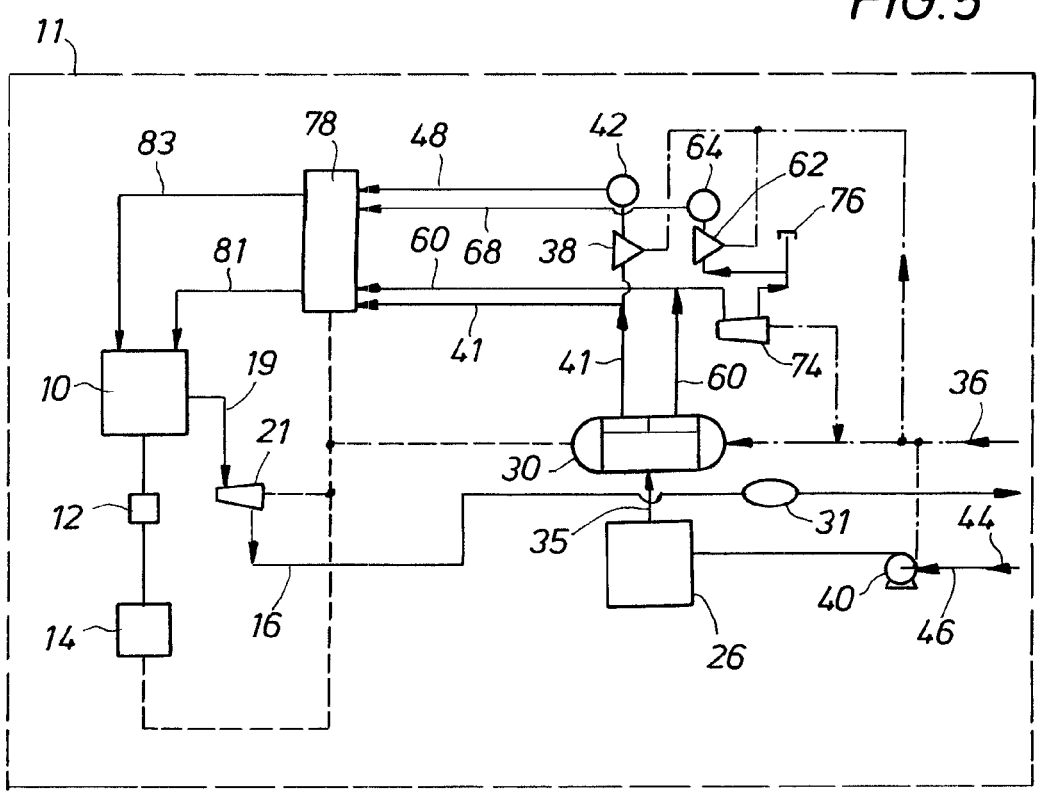
FIG. 6 is a block diagram of an alternate embodiment of the invention depicted in FIG. 5 wherein the engine exhaust vapor is passed through a catalytic converter and vented to the atmosphere.

Referring still to FIG. 5, one or more expanders are housed in an expander housing 78. The input manifold of the housing 78 includes two connectors for air and/or oxygen and two connectors for hydrogen for illustrative purposes. It is understood that the housing 78 may include a greater or fewer number of input connectors to match the number of expanders housed within the expander housing 78. The output side of the housing 78 is provided with an outlet port for connection to a hydrogen conduit 81 and a second outlet port for connection to an oxygen conduit 83 which are in fluid communication with the intake manifold of the engine 10. The housing 78 is internally configured to accept and route multiple input conduits to the hydrogen and oxygen outlet ports. In the alternate embodiment of FIG. 6, the exhaust vapor from the engine 10 is vented to the atmosphere.

Figure 7:
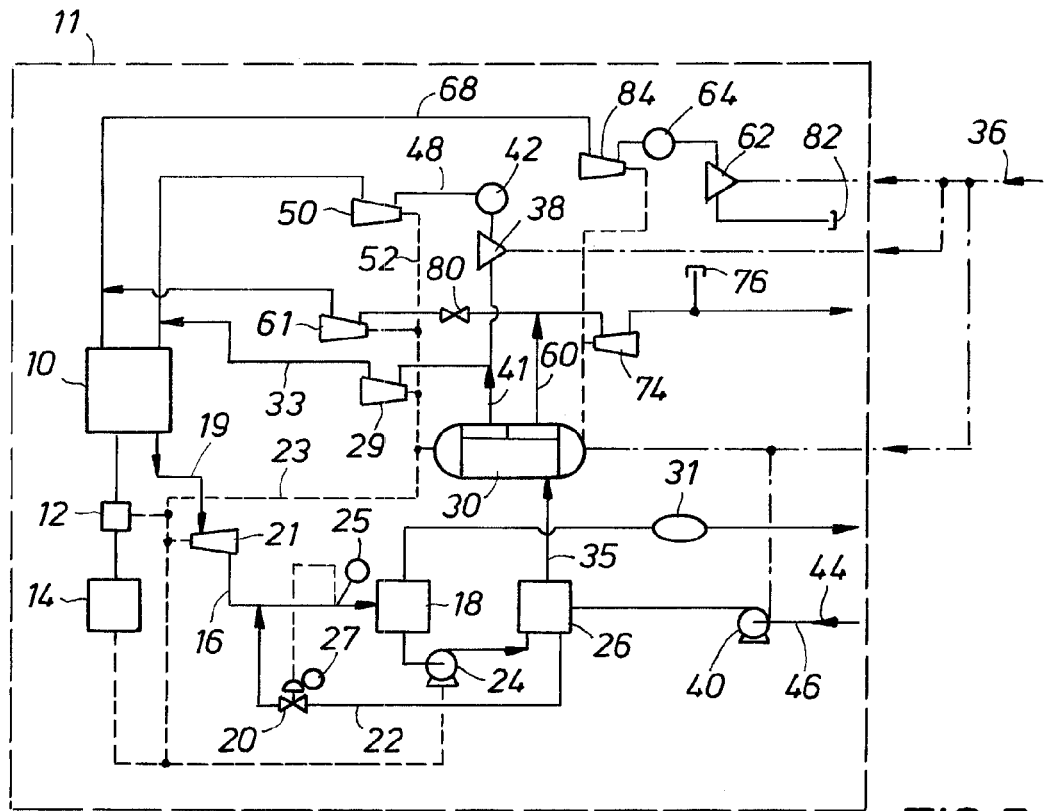
FIG. 7 is a block diagram of an alternate embodiment of the invention depicted in FIG. 5 adapted for storing pressurized air in a storage tank for selectively supplying pressurized air and oxygen to the fuel mixture to power an internal combustion engine.
Figure 8:
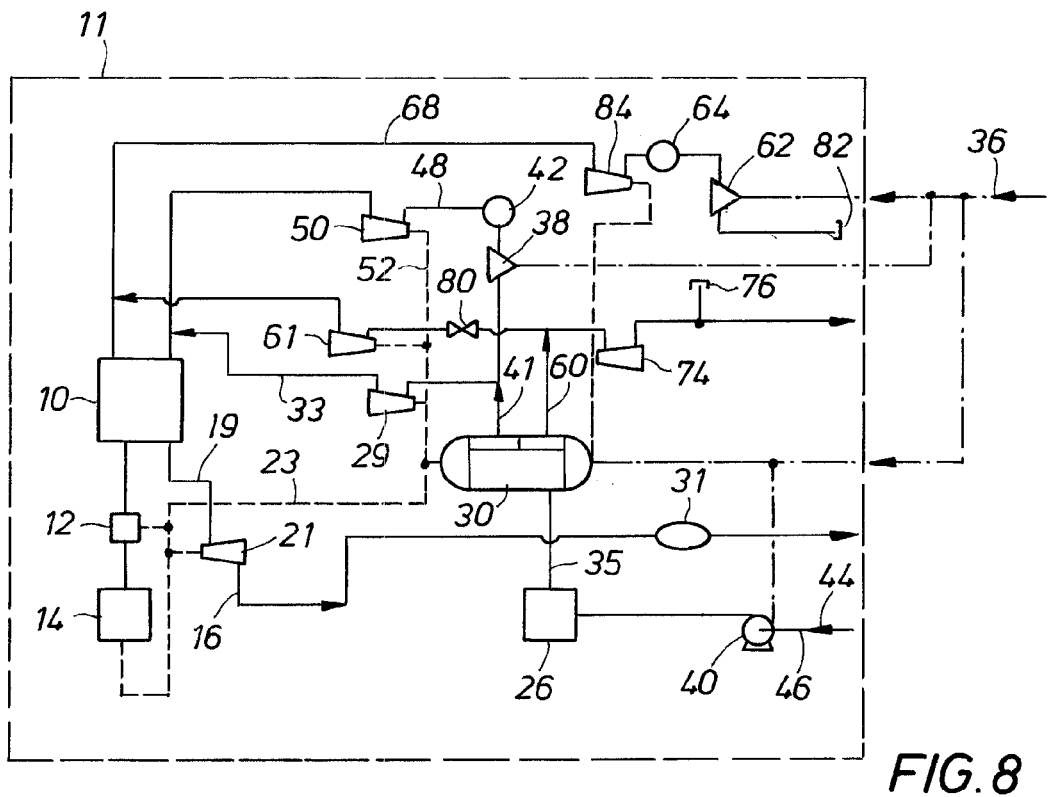
FIG. 8 is a block diagram of an alternate embodiment of the invention depicted in FIG. 7 wherein the engine exhaust vapor is passed through a catalytic converter and vented to the atmosphere.

Referring now to FIG. 7 another alternate embodiment of the fuel system of the present invention is shown. The embodiment of FIG. 7 is substantially the same as the embodiment of FIG. 5 described hereinabove with the exception that the oxygen conduit 60 includes a valve 80 incorporated therein for controlling the supply of oxygen from the electrolyzer 30 to the engine 10. The valve 80 is operatively coupled to an engine control unit (not shown in the drawings) for regulating oxygen flow to the engine 10. In addition, oxygen generated by the electrolyzer 30 and not routed to the engine 10 is routed through the expander 74 and air mixer 76 where it is vented to the atmosphere. The compressor 62 draws air through a port 82 open to the atmosphere. The air is pressurized and stored in the storage tank 64. When the vehicle 11 is operating, the compressed air in storage tank 64 is passed through an expander 84 and routed to the intake manifold of the engine 10 as described hereinabove relating to FIG. 1. In the alternate embodiment of FIG. 8, the exhaust vapor from the engine 10 is vented to the atmosphere.

While preferred and alternate embodiments of the invention have been shown and described, other and further embodiments of the invention may be devised without departing from the basic scope thereof, and the scope thereof is determined by the claims that follow.

The invention claimed is:

1. A fuel system for an internal combustion engine, comprising:
    (a) an air intake port open to the atmosphere;
    (b) a hydrogen storage tank containing pressurized hydrogen operatively connected to said engine;
    (c) an electrolyzer for generating hydrogen and oxygen operatively connected to said engine;
    (d) a water reservoir in fluid communication with said electrolyzer;
    (e) electric circuit means for providing electric power to said electrolyzer;
    (f) conduit means for supplying pressurized hydrogen to said engine; and
    (g) an engine exhaust conduit extending from said engine in fluid communication with said electrolyzer.

2. The fuel system of claim 1, wherein the engine exhaust is routed through a condenser and condensed into water prior to being routed to said electrolyzer.

3. The fuel system of claim 2, including means for injecting water into said engine exhaust conduit for cooling exhaust vapor from said engine.

4. The fuel system of claim 1, including a catalytic converter for filtering pollutants from exhaust vapor generated by said engine.

5. The fuel system of claim 1, wherein said conduit means includes a first conduit for routing hydrogen from said hydrogen storage tank to said engine and a second conduit for routing hydrogen from said electrolyzer to said engine and further includes one or more expanders for reducing the pressure of said hydrogen to the intake pressure of said engine.

6. The fuel system of claim 5, including a first compressor operatively connected to said hydrogen storage tank.

7. The fuel system of claim 1, wherein oxygen produced by said electrolyzer is routed through an expander and an air mixer prior to venting into the atmosphere.

8. The fuel system of claim 1, wherein said electric circuit means includes a first electric circuit electrically coupling one or more expanders with said electrolyzer.

9. The fuel system of claim 8, wherein said electric circuit means includes a second electric circuit electrically coupling said electrolyzer to an external power source.

10. The fuel system of claim 8, wherein said first electric circuit includes at least two expanders electrically coupled to said electrolyzer.

11. The fuel system of claim 9, including an electrical receptacle for connecting said second electric circuit to an external power source.

12. The fuel system of claim 1, wherein said water reservoir includes a fill port for adding water to said water reservoir.

13. The fuel system of claim 1, including:
   (a) an oxygen/air storage tank containing pressurized oxygen and air operatively connected to said engine; and
   (b) oxygen/air conduit means for routing pressurized oxygen and air to said engine.

14. The fuel system of claim 13, including a first oxygen/air conduit for routing an oxygen and air mixture from said oxygen/air storage tank to said engine and a second oxygen/air conduit for routing oxygen generated by said electrolyzer to said engine.

15. The fuel system of claim 14, including an oxygen/air compressor operatively connected to said oxygen/air storage tank.

16. The fuel system of claim 14, including an air mixer operatively connected to said oxygen/air storage tank.

17. The fuel system of claim 13, including an expander housing for housing one or more expanders and wherein said expander housing includes multiple inlet ports in selective fluid communication with said hydrogen storage tank and said oxygen/air storage tank.

18. A fuel system for an internal combustion engine, comprising:
   (a) an oxygen storage tank containing pressurized oxygen operatively connected to said engine;
   (b) a hydrogen storage tank containing pressurized hydrogen operatively connected to said engine;
   (c) an electrolyzer for generating hydrogen and oxygen operatively connected to said engine;
   (d) a water reservoir in fluid communication with said electrolyzer;
   (e) electric circuit means for providing electric power to said electrolyzer;
   (f) conduit means for supplying pressurized hydrogen and oxygen to said engine; and
   (g) an engine exhaust conduit extending from said engine in fluid communication with said electrolyzer.

19. A method of generating hydrogen for an internal combustion engine, said method comprising the steps of:
   (a) providing an electrolyzer operatively connected to said engine;
   (b) connecting said electrolyzer to a power source and applying an electric current for generating hydrogen and oxygen;
   (c) pressurizing and storing hydrogen within a first storage container;
   (d) supplying pressurized hydrogen to said engine while said engine is operating;
   (e) providing a water reservoir in fluid communication with said electrolyzer; and
   (f) recycling exhaust vapor generated by said engine to said electrolyzer.

20. The method of claim 19 including the step of condensing said exhaust vapor into water and routing the water to said electrolyzer.

21. The method of claim 19 including the step of pressurizing and storing oxygen in a second storage container.

22. The method of claim 19 including the step of supplying pressurized oxygen to said engine.

23. The method of claim 22 including the step of providing one or more expanders and routing pressurized hydrogen and oxygen through said expanders to reduce the pressure of said hydrogen and said oxygen to the intake pressure of said engine.

24. The method of claim 22 including the step of providing a first electric circuit coupling one or more expanders to said electrolyzer.

25. The method of claim 24 including the step of providing a second electric circuit coupling said electrolyzer to an external power source.

* * * * *